G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 1.
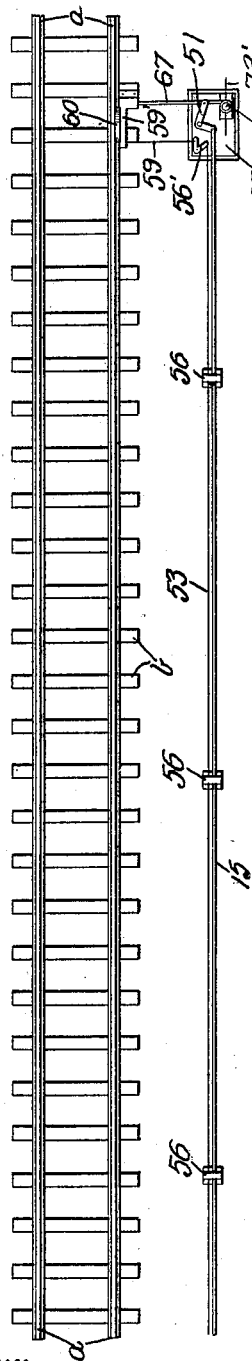
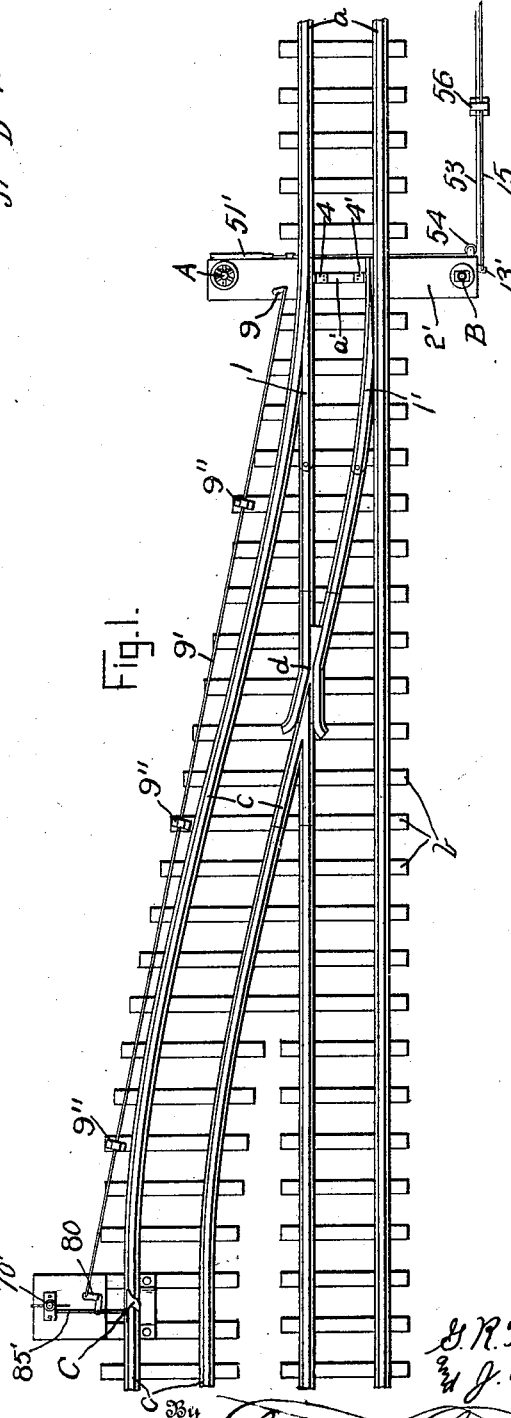

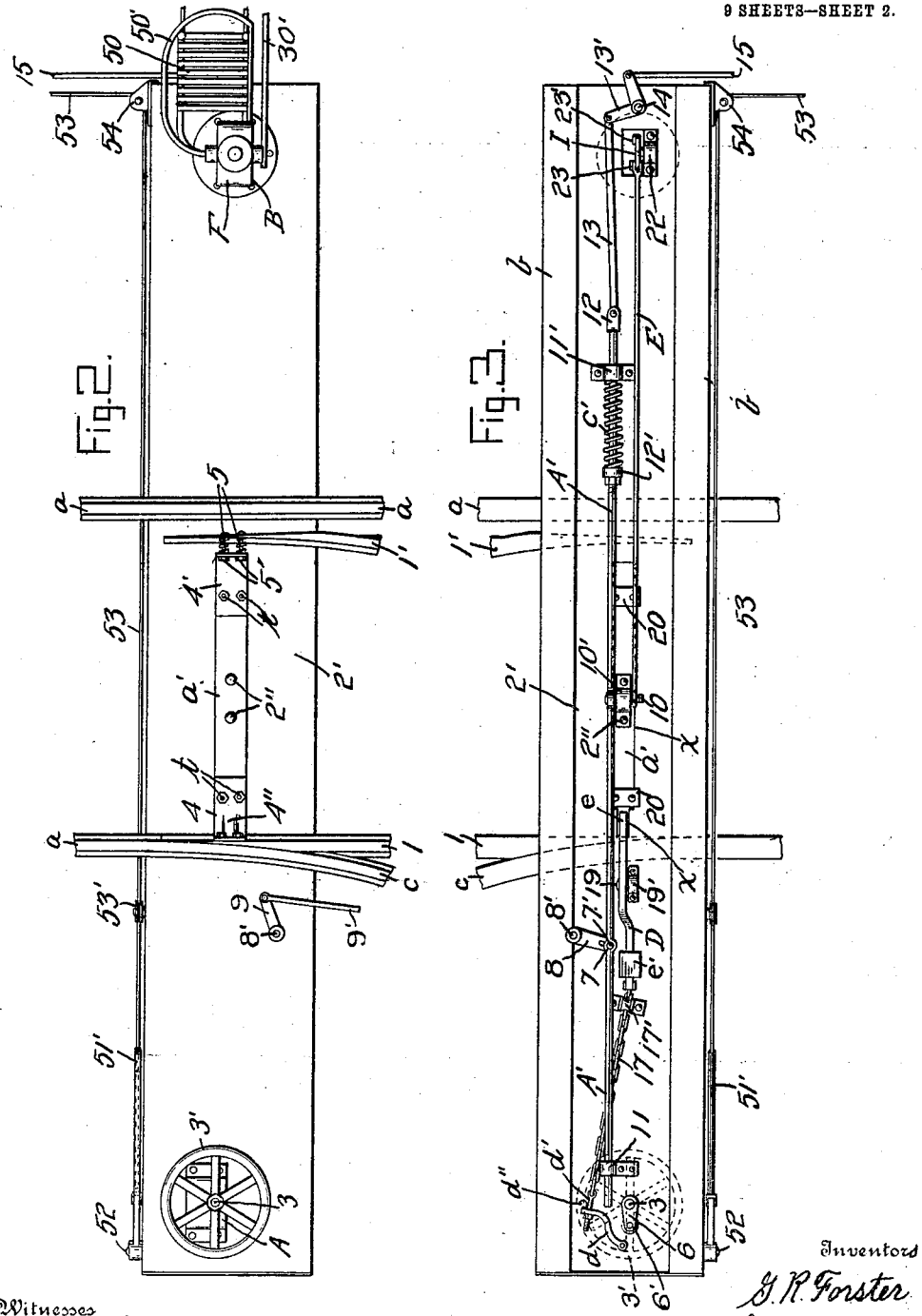

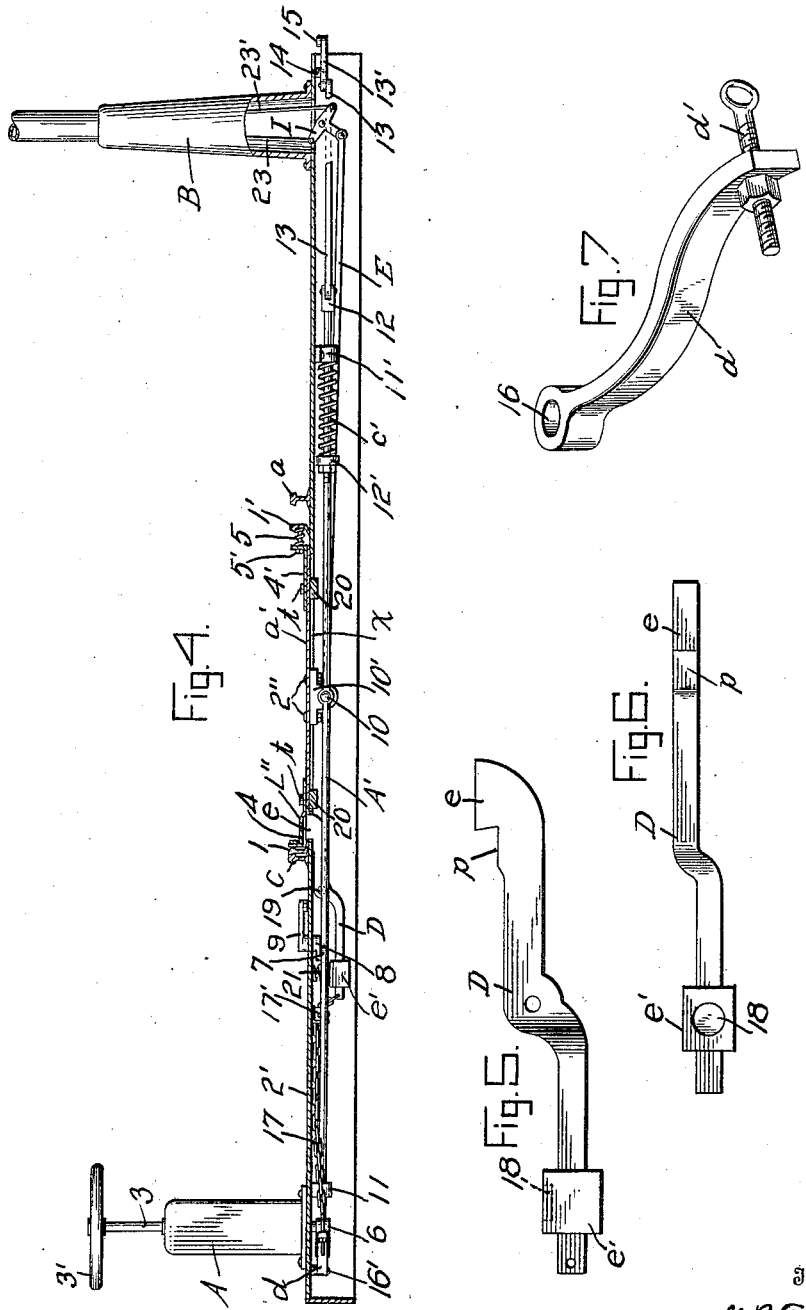

G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 4.
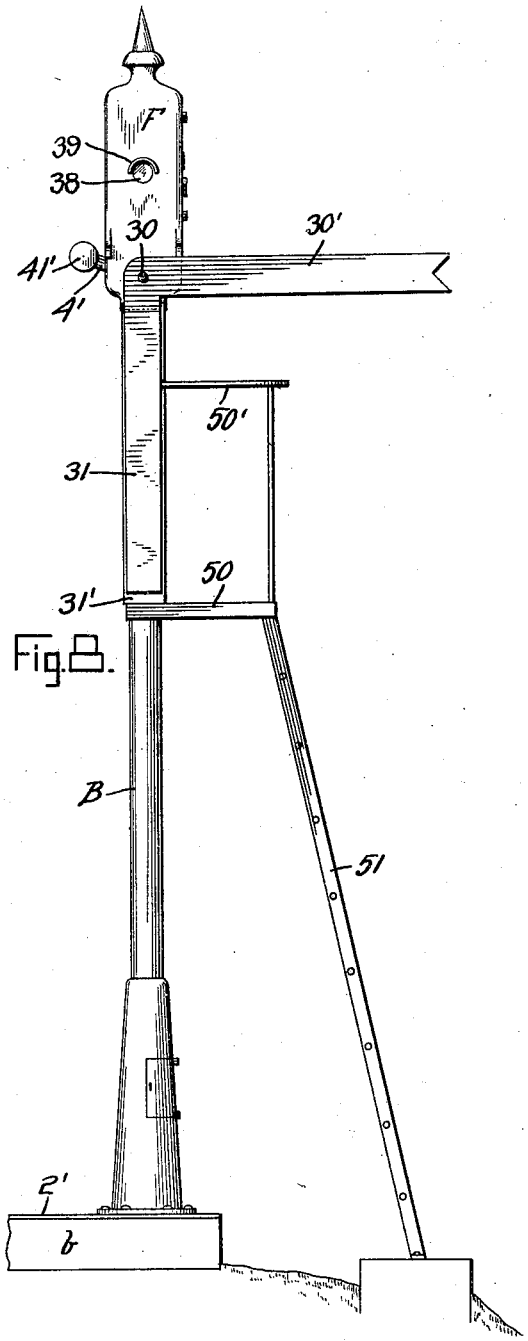
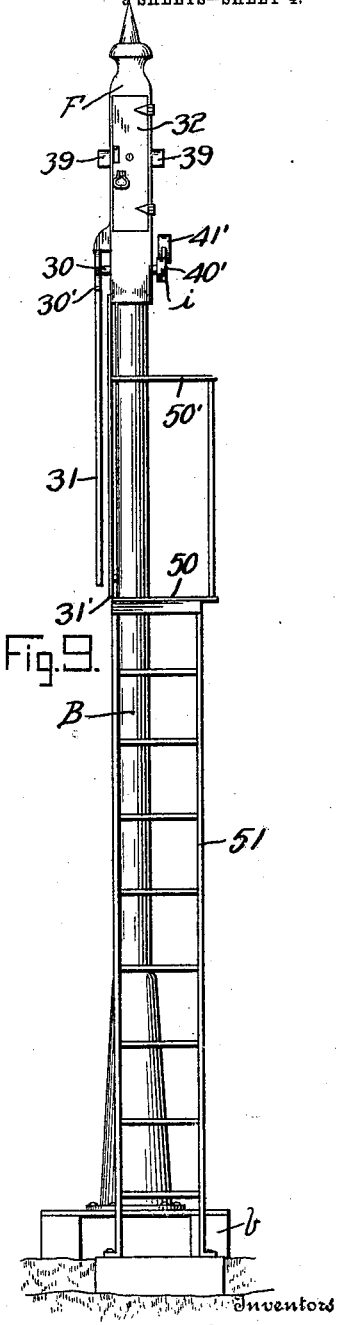

G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 5.
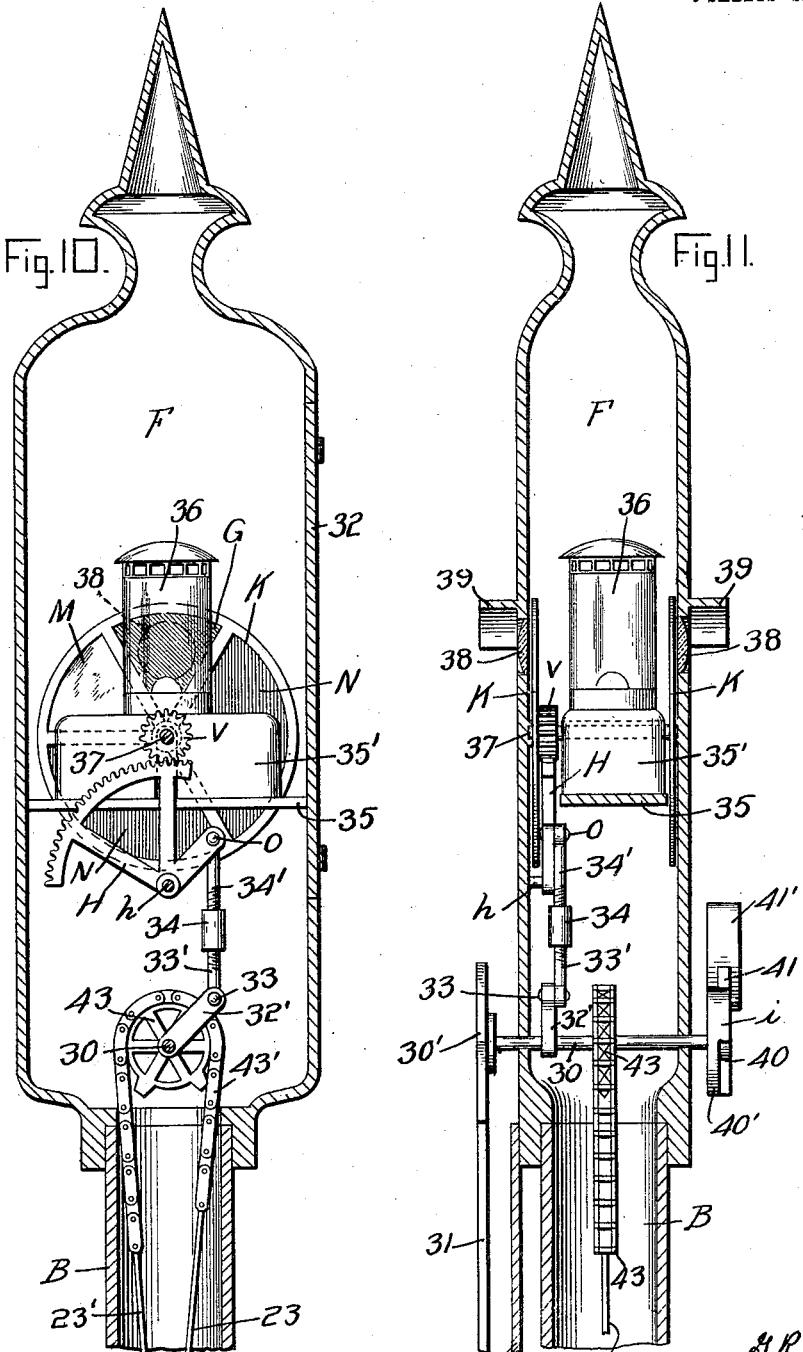

G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 6.
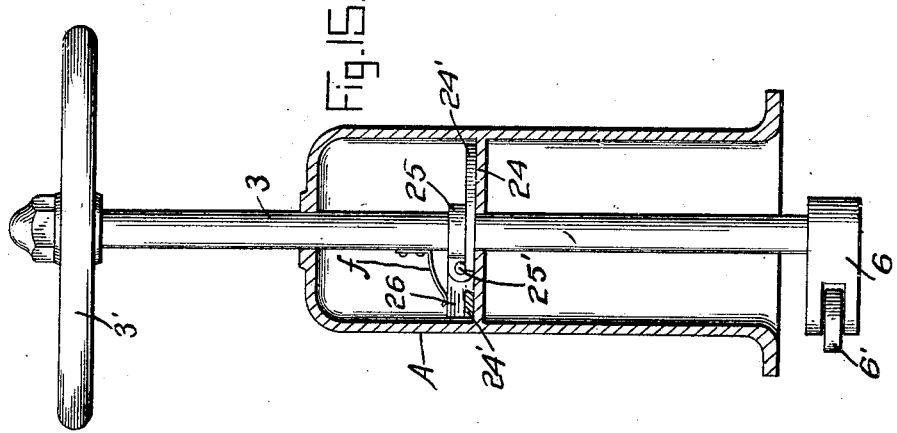
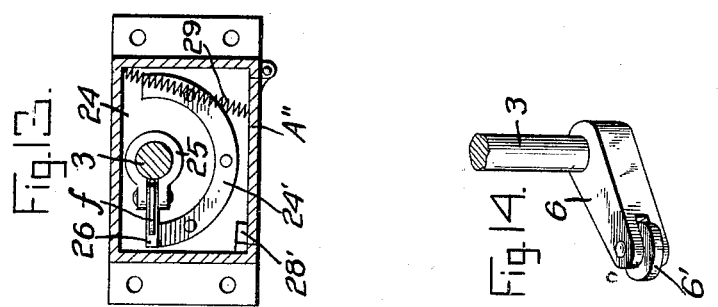
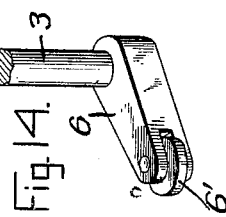
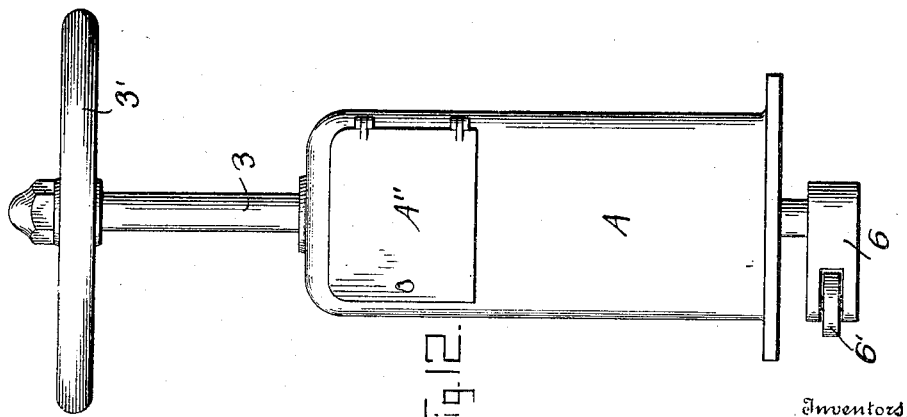
Witnesses
C. K. Reichenbach.
Geo. W. Sulo.
Inventors
G. R. Forster
J. Coan
By
Attorneys G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 7.
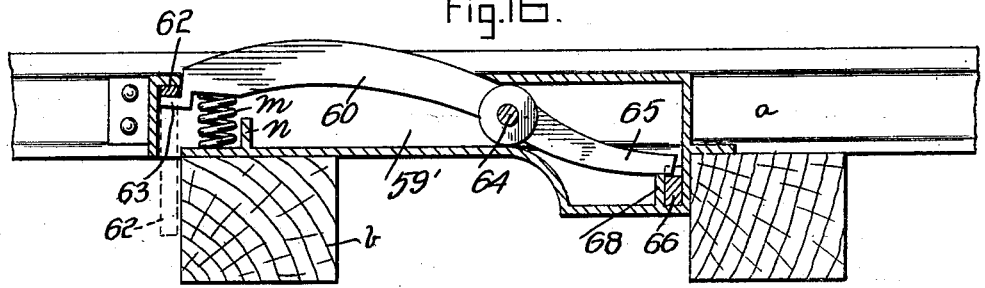
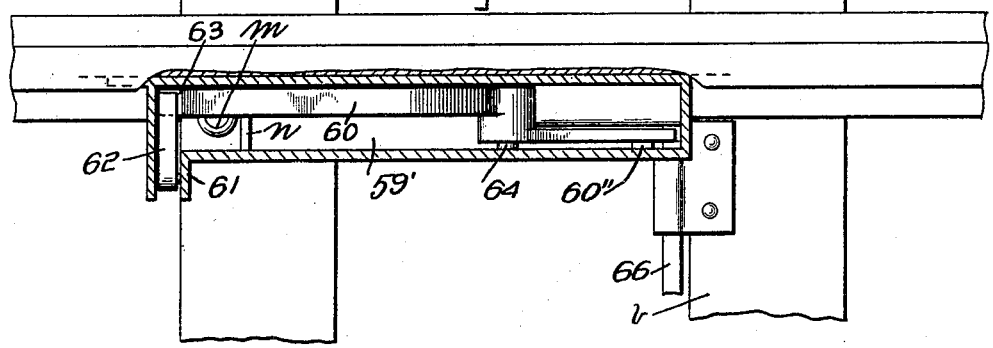
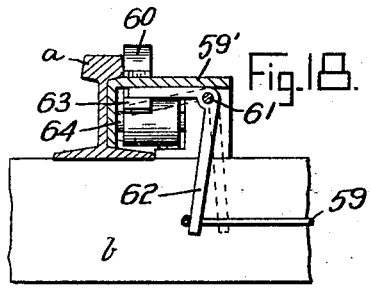
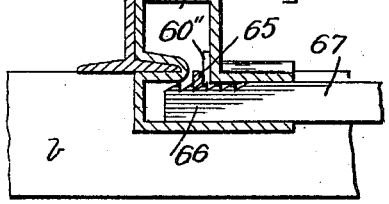
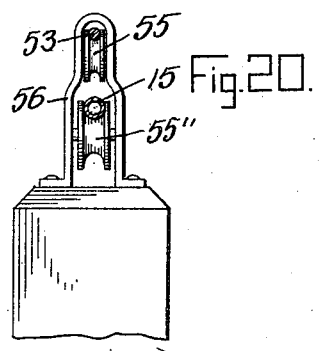

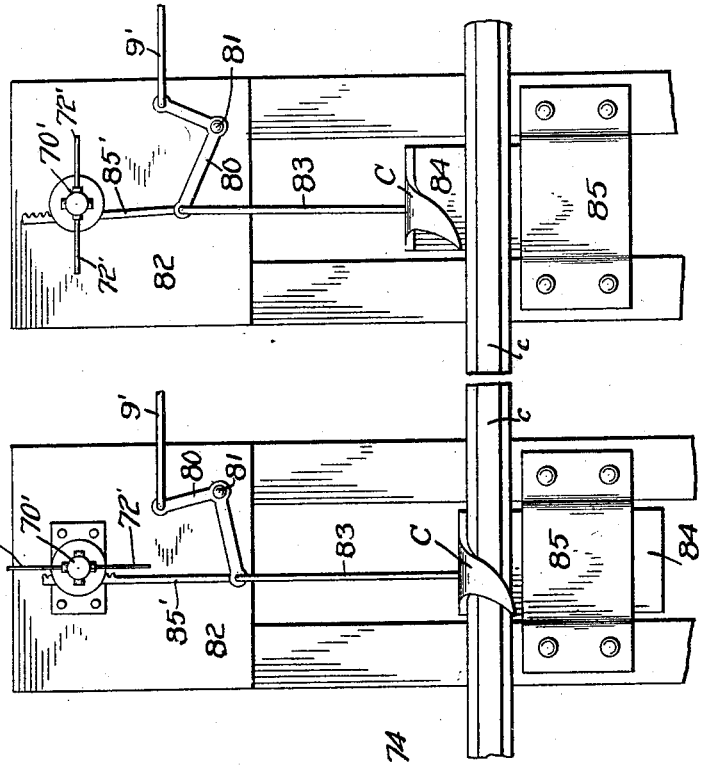

G. R. FORSTER & J. COAN.
AUTOMATIC RAILWAY SWITCH AND SIGNAL.
APPLICATION FILED DEC. 19, 1907.
903,462.
Patented Nov. 10, 1908.
9 SHEETS—SHEET 9.
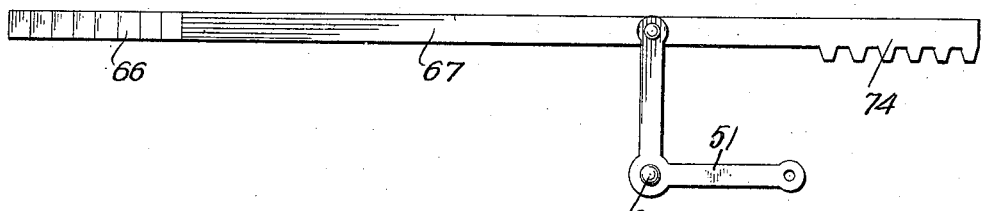
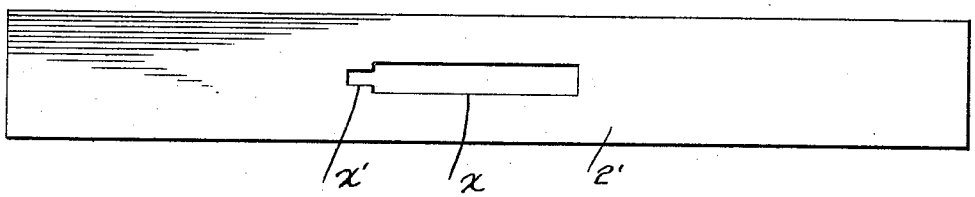
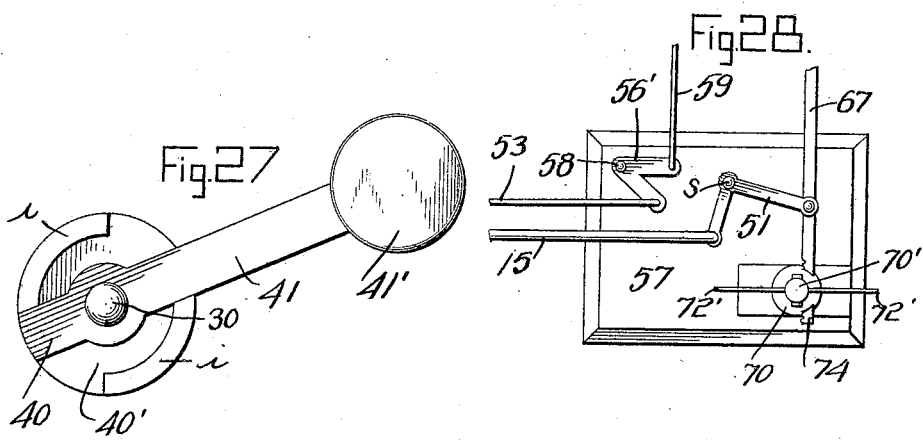
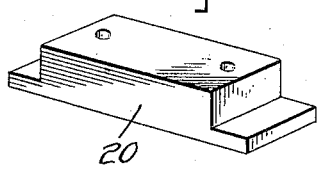

UNITED STATES PATENT OFFICE.

GEORGE R. FORSTER, OF FITHIAN, AND JAMES COAN, OF WESTVILLE, ILLINOIS; SAID FORSTER ASSIGNOR TO SAID COAN.

AUTOMATIC RAILWAY SWITCH AND SIGNAL.

No. 903,462.     Specification of Letters Patent.     Patented Nov. 10, 1908.

Application filed December 19, 1907. Serial No. 407,240.

*To all whom it may concern:*

Be it known that we, GEORGE R. FORSTER and JAMES COAN, citizens of the United States, residing at Fithian and Westville, respectively, in the county of Vermilion, State of Illinois, have invented certain new and useful Improvements in Automatic Railway Switches and Signals; and we do hereby declare the following to be a full, clear, and exact description of the invention, such as will enable others skilled in the art to which it appertains to make and use the same.

This invention relates to an automatic railway switch and signal.

The object of our invention is to provide a switch and signal system so constructed as to prevent wrecks through open switches, means being provided so that in case the switch points are moved in any way this movement will be multiplied and transferred to a semaphore signal to indicate danger, the instrumentalities being further so arranged that any setting or movement of the switch will also be recorded by means of a lamp signal, and our invention also embodies certain other novel constructions and combinations as will be described more fully hereinafter.

In carrying out the aim of our invention, we provide a switch-stand having a housing containing a latch normally locking the operating shaft employed to actuate the switch-point locking detent as well as shifting the switch points. The operation of this shaft which is provided with a suitable hand-wheel also sets the semaphore and lamp signals at the switch-stand and the lamp and warning signals ahead of the switch and throws a derailing block upon the side track. In connection with these instrumentalities we use a throwing lever operating in connection with a track lever so arranged that a tilting of the track lever will close the switch.

In the accompanying drawings, we have shown in Fig. 1 a top view of a detached track section disclosing the relative positions of the derailing block, the switch forming shaft, and the lamp signal positioned ahead of the switch stand. Fig. 2 discloses an enlarged detached detail of the switch points, the switch stand and signal tower. Fig. 3 shows an under face or bottom view of the switch-point actuating mechanism. Fig. 4 discloses an enlarged detached detail partly in section of the switch-point operating mechanism. Figs. 5 and 6 show respectively, a side and top view of the switch point locking detent. Fig. 7 shows a perspective of the striker arm. Figs. 8 and 9 disclose respectively a front and side view of the signal tower as used in our invention. Figs. 10 and 11 disclose respectively enlarged sectional details showing front and side views of the signal disk operating mechanism as used in our invention. Fig. 12 shows a detached elevation of the switch stand as used in our invention. Fig. 13 discloses the latch used in locking the switch stand shaft. Fig. 14 shows a broken perspective view of the striker head. Fig. 15 shows a sectional elevation of the switch stand shaft and latch. Figs. 16 and 17 disclose respectively enlarged details of the track bar as used in our invention. Fig. 18 shows an enlarged detached detail of the track bar and lever used in actuating same. Fig. 19 discloses an enlarged detail showing the end of the track bar in engagement with the rack bar. Fig. 20 discloses an enlarged detail of one of the cable stands. Fig. 21 discloses an elevation partly in section of the lamp signal placed adjacent the derailing block. Fig. 22 shows a sectional detail disclosing a rack bar in engagement with one of the lamp standard gears. Figs. 23 and 24 disclose top views showing the derailing block in engagement and out of engagement respectively with the rail. Fig. 25 shows an enlarged detached detail of the duplex rack bar as used in our invention. Fig. 26 shows a top view of the base plate. Fig. 27 shows an end view of the drop weight. Fig. 28 shows an enlarged plan view of one of the signal lanterns, while, Fig. 29 shows a detail of one of the guiding shoulders working within the slot of the base plate.

In carrying out the object of our invention, we provide the track below the switch points with a base plate. In Fig. 1 is shown a main track, the rails being marked *a* and the ties *b*. From this main track extends a siding the rails of which are represented at *c* and this siding has the usual frog *d* and the pivotally held switch points 1 and 1'.

Now the object of our invention is to provide a device which will disclose by means of a visible signal, any displacement of these switch points 1 and 1'. In accomplishing this we connect the switch points by means of a sliding plate *a'* shown in top view in Fig. 1, this sliding plate being secured to the switch point 1 by means of the angle plate 4 held by means of suitable bolts, while the remaining switch point 1' is secured to the sliding plate by means of the angle plate 4' through which suitable bolts 5' pass, springs 5 being interposed between the angle plate and the switch point as is usual in switch construction.

The base plate 2', as used in our invention and a detail of which is shown in Fig. 26, is provided with a slot $x$ having a seat $x'$ at one end thereof.

Secured to the sliding plate $a'$ and by the same bolts that secure the angle plates 4 and 4' are the shoulder plates 20, 20 shown in Fig. 4 so that a sliding movement may be imparted to the plate $a'$. In Fig. 3 a bottom view of these plates 20 is shown.

Centrally there is secured to this sliding plate $a'$ a bearing 10' secured by means of the bolts 2'' as shown in Fig. 4 and this bearing 10' carries a bolt 10 which bolt in turn supports intermediate of its ends a push bar A', this bar being shown in Figs. 3 and 4.

At one end, as shown in Fig. 3, this push bar is slidably held within the bearing 11 while at the remaining end the bar is held within the bearing 11'. Near one end this push bar is provided with an eye 7 carrying a pin 7' which pin works within the slot of a crank arm 8, while near the opposite end the push bar is provided with a stop shoulder 12', a suitable coil-spring $c'$ being held upon this push rod and working between the stop shoulder 12' and the bearing 11' as shown also in Fig. 4, the rod finally being bifurcated as shown at 12 to pivotally receive a connecting rod 13 which in turn is pivotally secured to the bell crank 13' shown in Fig. 3. Positioned upon the base plate 2' is a switch stand A provided with a shaft 3 shown in enlarged detail in Fig. 15 which below has secured to it a striker head 6 having the sheave 6'. Now the instrumentalities are so arranged that when the spring $c'$ has forced the connected bar endwise its full direction, the end of the push bar projecting beyond the bearing 11 will be in the path of the striker head 6 as is shown in Fig. 3.

Positioned adjacent the end of the striker bar A' and proximal to the striker head is the striker arm $d$, a detail of which is shown in Fig. 7. This striker arm is provided with a set bolt $d'$ from which extends a chain 17, passing over a sheave 17' shown in Fig. 3 which is secured to the bottom of the base plate 2', and the end of this chain 17 is secured to the end of the detent D, details of which are shown in Figs. 5 and 6. This detent D is provided with a projecting nose $e$ which is adapted to lock against the base flange of the switch point 1, the nose extending into the slot $x$ within the base plate, the position of this slot $x$ being shown in Fig. 26.

The detent D is provided with a weight $e'$ fixed at a proper point and this weight, shown in Fig. 6, is provided with a seating 18 and held within the seating is a coil spring 21 shown in Fig. 4 which normally exerts a pressure against this detent, the upper end of the spring working against the base plate as shown. By means of this arrangement the locking nose $e$ will normally extend beyond the face of the base plate 2' locking against the switch point 1 while the chain will be so adjusted that the striker arm $d$ will be carried forward a proper distance, a suitable stop pin $d''$ being provided as shown in Fig. 3. This detent is carried upon a pin 19 held within a bearing 19' as clearly shown in Fig. 3.

Extending from the pin 10 shown in Figs. 3 and 4 is a rock bar E which is connected to the depending stem of a rocker head I as shown in Fig. 4, and extending from this rocker head are the connecting rods 23 and 23' shown also in Fig. 10, these rods crossing one another in the tubular standard B and are carried upward and are provided with a chain 43' passing over the chain gear 43 secured to the crank rock shaft 30, a side elevation of which is shown in Fig. 11. Secured to this crank provided rock shaft is a disk 40', this disk at opposite points being provided with the projecting stop lips $i$ as shown in Figs. 11 and 27. Loosely mounted upon this rock shaft 30 is an arm 41 the projecting end 40 of which is adapted to be brought into engagement with the stop lips $i$ while the arm 41 is also adapted to come in contact with a lip as shown in Fig. 27, the end of the arm being provided with a suitable weight 41', the arm and weight forming a trip for the shaft 30 as will be described more fully hereinafter. Secured to this rock shaft 30 is the crank 32' provided with a pin 33 as clearly shown in Fig. 10 receiving the lower rod 33' of a coupling, the upper end of which is engaged by a threaded sleeve 34 from which extends the upper end of a coupling rod 34' this rod by means of a pin O, being pivotally secured to a gear sector H mounted upon the pin $h$ as shown in Figs. 10 and 11.

Passing transversely through the lamp housing F secured to the upper end of the standard B is the transverse gear-shaft 37 provided with a gear $v$ meshing with a gear sector H as shown in Fig. 10. This gear-shaft 37 is provided with two signal disks K provided with a number of glass plates as shown in Fig. 10 where the one marked G and set represents a green light while the following plates N, N represent a red light while the plates M represents a white light.

The signal as shown is set to safety and the least movement of the gear sector H will throw the red plate N into signal signifying danger.

Passing transversely across the lamp housing F as shown in Fig. 10 and Fig. 11 is a lamp shelf 35 upon which rests a lamp 35'. This lamp is divided in the middle so as to stride over the gear shaft 37, the lamp being provided with the usual chimney 36. The lamp housing F at proper points is provided with the lenses 38, 38 and these are protected by the projecting curved hoods 39 shown in Fig. 11. A suitable door 32 admits the lamp being inserted.

It will, of course, be understood that the glass plates within the two signal disks K are similarly set so that like signals will be flashed through each lens 38.

Secured to the rock shaft 30 is a right angled semaphore arm including the two members 31 and 30' as clearly shown in Fig. 8 where the semaphore is set to show a clear track.

The signal tower B is provided with a platform 50, supporting railing 50' and the ladder 51 as shown also in Fig. 9.

Secured near the switch stand A as shown in Fig. 2 is the lever 51' pivotally supported by means of a pin 52 and intermediate of its ends this lever is engaged by a wire strand or cable 53 which cable works over a suitable pulley 53' and through a bracket 54 secured to the base plate 2' as shown also in Fig. 3 and carried over a number of sheaves 55 held within a yoke 56, as shown in Fig. 20, this cable finally being led to a bell crank 56' secured to a suitable base plate 57 as shown in Fig. 1 and Fig. 28. This bell crank 56' is supported upon a pin 58 and extending therefrom is a connecting rod 59, which rod is carried into a housing 59' suitably supporting a track bar 60 as shown in Figs. 16 and 17 also. Held within this housing 59' is the pin 61 shown in top view in Fig. 17 and this pin supports a lever 62 which receives the end of the connecting rod 59 as clearly shown in Fig. 18. The upper arm of this lever 62 is horizontally held against the top of the housing and pressing against this horizontal arm is the lip 63 of the track bar 60, this lip also being clearly shown in Fig. 16 where the upper end of the lever 62 is also shown. This track bar 60 is pivotally held upon the pin 64 shown in Fig. 17 while the end of the track bar projects downward as is shown at 65 to be brought into engagement with the ratchet end 66 of the duplex rock bar 67 shown in top view in Fig. 25. This pawl end of the rock bar 67 is guided by means of the shoulder 68 provided within the bottom of the housing 59' as clearly shown in Fig. 16.

In Fig. 19 we disclose the broken ratchet end 66 of the ratchet bar 67 in engagement with the pawl-end 65 of the track bar 60. At one end the housing 59' is provided with a shoulder $n$ shown in top view in Fig. 17 which acts as a stop to a coil spring $m$, $m$ shown in Fig. 16 which presses against the track bar 60 to normally force the lip 63 upward to tilt the lever 62 and force the same under cushioned or spring held contact against the top of the housing 59' as shown in Figs. 16 and 18. Now it is remembered that this strand 53 is led to the lever 51' and that this bar 59 is actuated by means of this lever 56'. Positioned upon the base plate 57 at a suitable point is a standard 70 supporting a shaft D provided above with a suitable signal lantern 70' provided with two sets of signal lenses 71 and 72 so that when set to safety one color is shown and when the standard D is rotated 90 degrees a second signal light will be disclosed. This standard is further provided with the metallic flags 72' as is usual in signals of this class while below is secured to this standard a gear 73 which gear meshes with the rack 74 of the bar 67 as shown in Figs. 25 and 22. From this it will be seen that when this bar 67 is rocked it rotates the signal lamp 70' as well as works under the pawl-end 65 of the track bar 60. This track bar 60 is so curved that when it is in its uppermost position as shown in Fig. 16 a portion of the track bar will project beyond the tread of the rail so that a car wheel in passing over the track will dip or rock this track bar 60. When this is done the pawl-end 65 is raised upward and out of engagement with the ratchet bar 66.

In Fig. 17 we have shown a top view of the lever 62 and the track bar 60.

Referring now to Fig. 2 it will be noticed that a shaft 8' is shown and this shaft, it will be recalled, was described as having secured to it below the arm 8 shown in Fig. 3 and that this arm was rocked by means of the push bar A'. Now this stub shaft 8' is revolubly held within the base plate and above has fixed to it the arm 9 from which extends a connecting rod 9' and this connecting rod 9', referring now to Fig. 1, is led to a bell crank 80, this crank being shown in Figs. 23 and 24. This connection 9' is preferably in the form of a tube and is held within suitable bearings 9'' secured to the ties $b$ as shown in Fig. 1. Now this bell crank 80 is secured to a pin 81 fixed within the plate 82 and has secured to it a bar 83 which is connected to the derailing block C, the bottom flange of which 84 works within a suitable housing 85 as shown in Fig. 23. Extending from this bell crank 80 is a rack bar 85' exactly similar to the one shown in Fig. 22 and actuating a signal lamp 70' a counterpart of the lamp described and shown in Fig. 21. Now whenever this bell crank is rocked to actuate the derailing block C, the signal lamp 70' fixed at this point is set to throw a signal disclosing that the derailing block has been shifted.

In Fig. 23 a derailing block is set to derail a train upon a siding approaching the main track, the flags 72' being set to danger while in Fig. 24 the derailing block is shown in its normal position in which setting the flags are presented edgewise to the approaching train.

To operate the switch the trainman proceeds as follows. He first throws up the lever 51' as shown in Fig. 1 and this results in the pliable connection 53 being actuated to tilt the lever 62 as shown in Fig. 18 to permit the track bar 60 to fly upward being actuated by the spring m shown in Fig. 16. At the same time this results in the downward movement of the pawl-end 65 as shown also in Fig. 19. To insure a free movement of the pawl-end 65 within this housing, we provide the shoulder 60'' as shown in Fig. 17. Next the operator turns the switch stand shaft 3, referring now to Fig. 3, so that the striker 6 will be brought into engagement with the pivoted arm d so that the chain 17 will be drawn backward to tilt the detent D so that the nosing e will drop below the switch point 1. The angle plate 4' is dished as is shown at 4'' in Fig. 4 so that this nosing e is hooded and shielded below the angle plate 4. As the striker 6 continues to rotate, it finally comes in contact with the end of the push bar A' so that this push bar is actuated against the tension of the spring c' and as the sliding plate a' uniting the two switch points 1 and 1' is connected by means of the pin 10 to this push bar, these switch points are of course properly actuated to shift the same. Now as the push bar was actuated it at the same time rocked the crank arms 8 and 9 to actuate the connection 9' which, in referring to Fig. 1, it will be noticed is led to the derailing block C shown in Figs. 23 and 24 to throw this spring held block away from the rail as shown in Fig. 24 while the rod 85' at the same time rotated the signal lamp 70' to set this signal. As this push bar was carried backward the connected bell crank 13' as shown in Fig. 3 was actuated to operate the connection 15 which as shown in Fig. 1 is led to the bell crank 51 connected to the duplex rock bar 67 so that the rock end 66 of this bar was forced under the pawl-end of the track bar 60. As soon as the switch point 1' shown in Fig. 2 is properly cushioned against the adjoining rail a the movement of the rod A' will be checked and the operator will then release the operating wheel 3'. The spring c would properly throw the switch into its original position if it were not for the ratchet end 66 being in engagement with the track bar 60 so that the switch is held set for the siding by means of the track bar 60 and the duplex rock bar 67. From this it will be seen that the switch is set by means of the hand wheel 3' and held set to the siding by means of the track bar 60. To release the switch the operator will again have to throw the lever 51' to its original position to tilt the crank 62 to dip down the track bar 60. At the same time that the push bar A' is actuated the rocking head I is tilted to actuate the connecting rods 23 and 23' shown in Fig. 10, to set the semaphore 30' as well as the signal disks K to give a lamp and semaphore signal. At the same time that the rock bar 67 is actuated, the connected bell crank also operates the lamp connected with that bar as shown in Fig. 28. Now before any train could approach the open switch the trainmen would notice the danger signal set at the point adjacent the track bar 60. Should, however, the train men fail to notice this visible signal, as soon as the first wheel flange struck the track bar 60, this track bar would be actuated to release the rack bar 67 so that the switch which was held open under spring tension would be permitted to instantly snap back into its original position, the nosing e again finding a seating under and against the switch point 1 to lock the same.

Should a train approach the main track from the Y without the switch having been properly adjusted the train would encounter the derailing block C and be ditched.

The under side of the switch point 1 as shown in Fig. 4 is flanged so that the switch point readily rides over the detent D, this detent, it being remembered, is normally held in a closed position by means of the spring 21 also clearly shown in Fig. 4. In connection with our switch stand housing A we use a door A'' which is normally held in a locked condition by means of the spring 29, a spring lock 28' of any approved construction being provided as shown in Fig. 13. Now the main switch stand shaft 3 is normally held in a locked position by means of the latch 26 working in the collar 25 and spring held by means of the spring f and before this shaft 3 can be rotated the latch 26 must be lifted from behind the plate 24'. By this arrangement there is no likelihood of the locks being broken off the switch stand and the switch setting mechanism is more fully protected than where the open switch stand is used. The connections 53, 15, and 9' are preferably covered and contained within a wooden duct to protect them against the action of cold and heat and shield them against objects being thrown upon the same.

In order to quickly set the semaphore signal we have provided the trip weight 41' so arranged that as soon as the bar 41 is carried beyond the center the weight tumbles over and instantly throws the semaphore into proper position.

The detent D is provided with a shoulder p as shown in Figs. 5 and 6 which strikes below the plate 2' as shown in Fig. 4 and acts as a stop to hold the detent in proper position; and

Having thus described my said invention what I claim as new is

1. The combination in a device of the character described of the following instrumentalities to wit: a switch stand shaft, a spring pressed push bar, a striker head secured to said shaft and adapted to come into engagement with said push bar, means to connect said push bar to a switch point, a suitably held detent adapted to lock against said switch point, a striker arm in the path of said striker head, and a connection extending from said striker arm to said detent.

2. The combination in a device of the character described of the following instrumentalities to wit: a switch stand shaft, a spring pressed push bar, a striker head secured to said shaft and adapted to come into engagement with said push bar, means to connect said push bar to a switch point, a suitably held detent adapted to lock against said switch point, a striker arm in the path of said striker head, a connection extending from said striker arm to said detent, a suitably held shaft, a semaphore secured to said shaft, two connecting rods suitably secured to said shaft, a rocking head secured to said connecting rods, and a connecting rod extending from said rocking head to said push bar.

3. The combination in a device of the character described of the following instrumentalities to wit: a switch stand shaft, a spring pressed push bar, a striker head secured to said shaft and adapted to come into engagement with said push bar, means to connect said push bar to a switch point, a suitably held detent adapted to lock against said switch point, a striker arm in the path of said striker head, a connection extending from said striker arm to said detent, a crank arm secured to said push bar, a suitably held derailing block, a bell crank connected to said derailing block, and means to connect said crank arm and bell crank.

4. The combination in a device of the character described of the following instrumentalities to wit: a switch stand shaft, a spring pressed push bar, a striker head secured to said shaft and adapted to come into engagement with said push bar, means to connect said push bar to a switch point, a suitably held detent adapted to lock against said switch point, a striker arm in the path of said striker head, a connection extending from said striker arm to said detent, a gear-provided crank shaft, a chain passing over the gear of said crank shaft, rods pendent from the ends of said chain, a rocking head, said rods being secured to said rocking head, a bar connecting said rocking head to said push bar, a suitably held gear sector, means to connect said gear sector to the crank of said gear-provided shaft, a disk shaft, a gear secured to said disk shaft in mesh with said sector, and signal disks secured to said disk shaft.

5. The combination with a switch stand shaft, of a spring pressed push bar, a striker head secured to said shaft and adapted to come into engagement with said push bar, means to connect said push bar to a switch point, a bell crank, a rod connecting said bell crank to said push bar, a suitably held rack bar, means to connect said rack bar to said bell crank, and a spring held track bar having a pawl-end in engagement with said rack bar.

6. The combination with a switch stand shaft, of a spring pressed push bar, a striker head secured to said shaft and adapted to come into engagement with said push bar, means to connect said push bar to a switch point, a bell crank, a rod connecting said bell crank to said push bar, a suitably held rack bar, means to connect said rack bar to said bell crank, a spring held track bar having a pawl-end in engagement with said rack bar, and means to throw said track bar out of engagement with said rack bar.

7. The combination with a switch stand shaft, of a spring pressed push bar, a striker head secured to said shaft and adapted to come into engagement with said push bar, means to connect said push bar to a switch point, a bell crank, a rod connecting said bell crank to said push bar, a suitably held rack bar, means to connect said rack bar to said bell crank, a spring held track bar having a pawl-end in engagement with said rack bar, a bell crank in engagement with said track bar and means to actuate said last mentioned bell crank.

In testimony whereof, we affix our signatures, in presence of two witnesses.

GEORGE R. FORSTER.
JAMES COAN.

Witnesses:
W. P. REYNOLDS,
J. C. FREEMAN.